United States Patent
Ilan et al.

(10) Patent No.: US 6,335,726 B1
(45) Date of Patent: Jan. 1, 2002

(54) INSTRUCTION AND/OR IDENTIFICATION INPUT UNIT

(75) Inventors: Gabriel Ilan, Tel Aviv; Arie Kadosh, Naharia, both of (IL)

(73) Assignee: Art Advanced Regcognition Technologies Inc., Simi Valley, CA (US)

( * ) Notice: Subject to any disclaimer, the term of this patent is extended or adjusted under 35 U.S.C. 154(b) by 0 days.

(21) Appl. No.: 09/436,067

(22) Filed: Nov. 8, 1999

Related U.S. Application Data

(62) Division of application No. 08/878,741, filed on Jun. 19, 1997.

(30) Foreign Application Priority Data

Jan. 1, 1997 (IL) .................................................. 119955

(51) Int. Cl.$^7$ ................................................ G09G 5/00
(52) U.S. Cl. ..................................................... 345/173
(58) Field of Search .............................. 345/173, 168, 345/169, 172, 156, 847, 863, 864; 341/21–23; 382/3, 187, 209

(56) References Cited

U.S. PATENT DOCUMENTS

| | | |
|---|---|---|
| 4,374,381 A | 2/1983 | Ng et al. .................... 340/711 |
| 4,680,801 A | 7/1987 | Etherington et al. ........... 382/3 |
| 4,885,580 A | 12/1989 | Noto et al. .................... 341/23 |
| 5,157,737 A | 10/1992 | Sklarew ........................ 382/13 |
| 5,260,697 A | 11/1993 | Barrett et al. ................ 345/173 |
| 5,297,216 A | 3/1994 | Sklarew ........................ 382/13 |
| 5,327,161 A | 7/1994 | Logan et al. ................ 345/157 |
| 5,379,388 A | 1/1995 | Asghar ....................... 395/375 |
| 5,410,326 A | 4/1995 | Goldstein ................... 348/134 |
| 5,454,046 A | 9/1995 | Carmann, II ................ 382/186 |
| 5,481,625 A | 1/1996 | Suzuki ........................ 382/187 |
| 5,502,803 A | 3/1996 | Yoshida et al. .............. 395/146 |
| 5,545,857 A | 8/1996 | Lee et al. ...................... 178/18 |
| 5,550,930 A | 8/1996 | Berman et al. ............. 382/187 |
| 5,568,604 A | 10/1996 | Hansen ........................ 395/161 |
| 5,745,598 A | 4/1998 | Shaw et al. .................. 382/209 |

*Primary Examiner*—Chanh Nguyen
(74) *Attorney, Agent, or Firm*—Eitan, Pearl, Latzer & Cohen-Zedek

(57) ABSTRACT

An instruction input unit for supplying operating instructions to a machine is provided. The unit includes a touchpad, an instruction library and a recognizer. The touchpad receives an input pattern from a user and the instruction library stores a multiplicity of operating instruction patterns. Each operating instruction pattern has an operating instruction associated therewith. The recognizer detects which of the multiplicity of operating instructions patterns the input pattern most closely matches and provides the operating instruction associated with the matched operating instruction pattern to the machine. The recognizer includes a handwriting recognizer for recognizing alphanumeric characters.

3 Claims, 7 Drawing Sheets

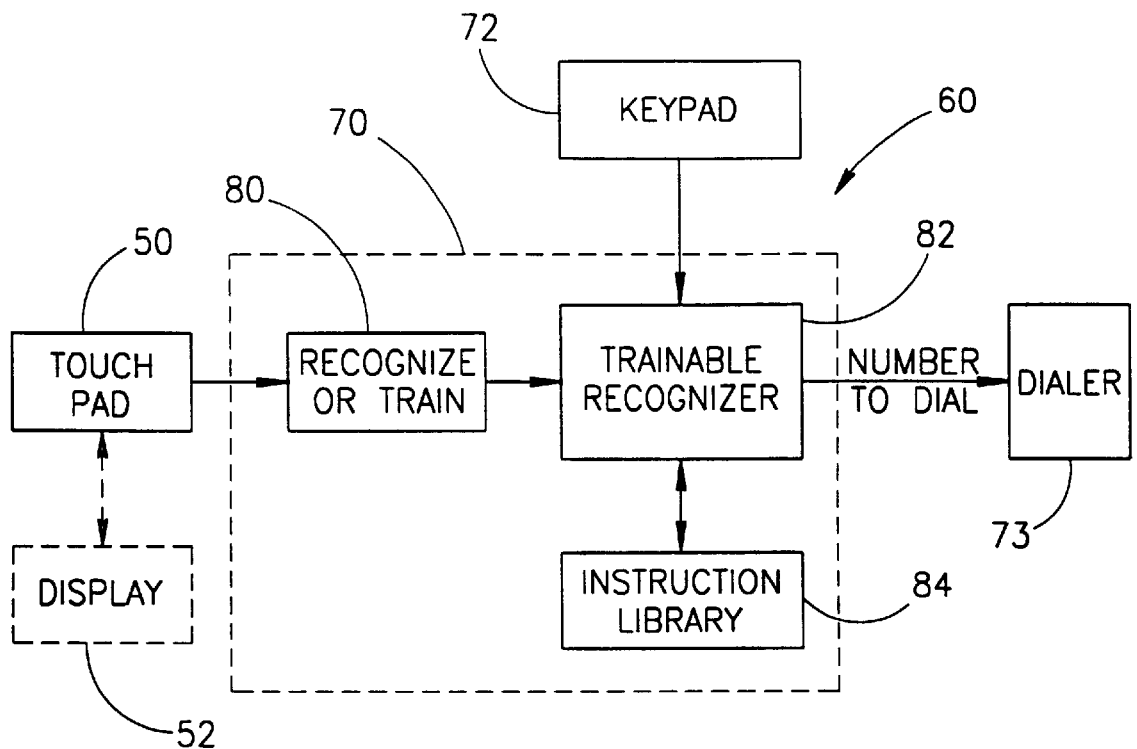
FIG.4
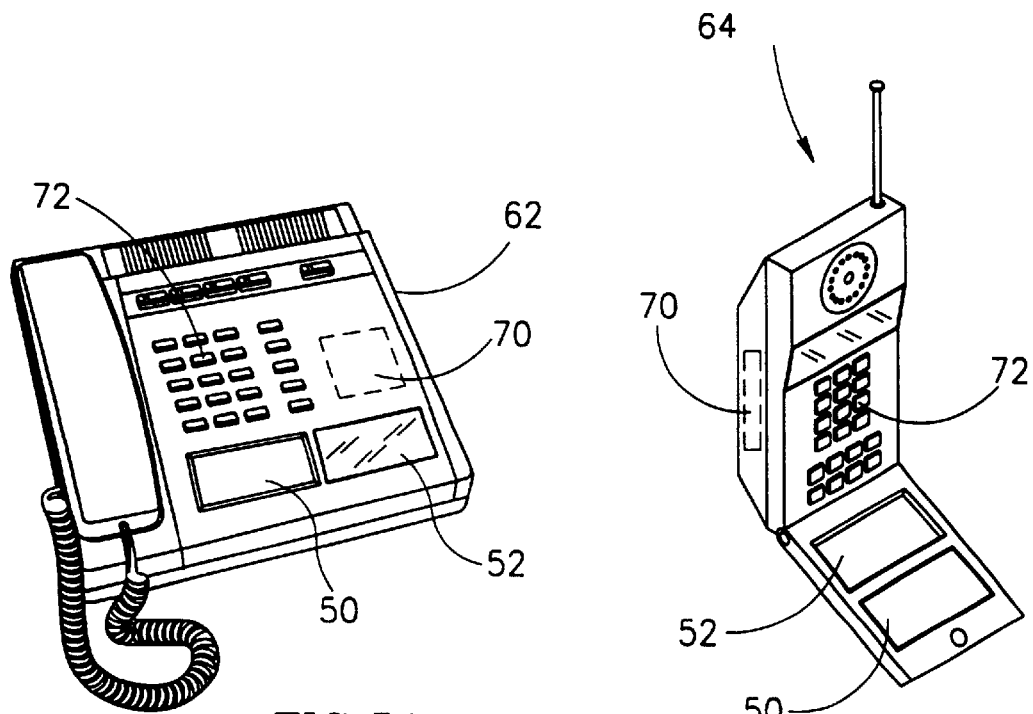
FIG.5A
FIG.5B

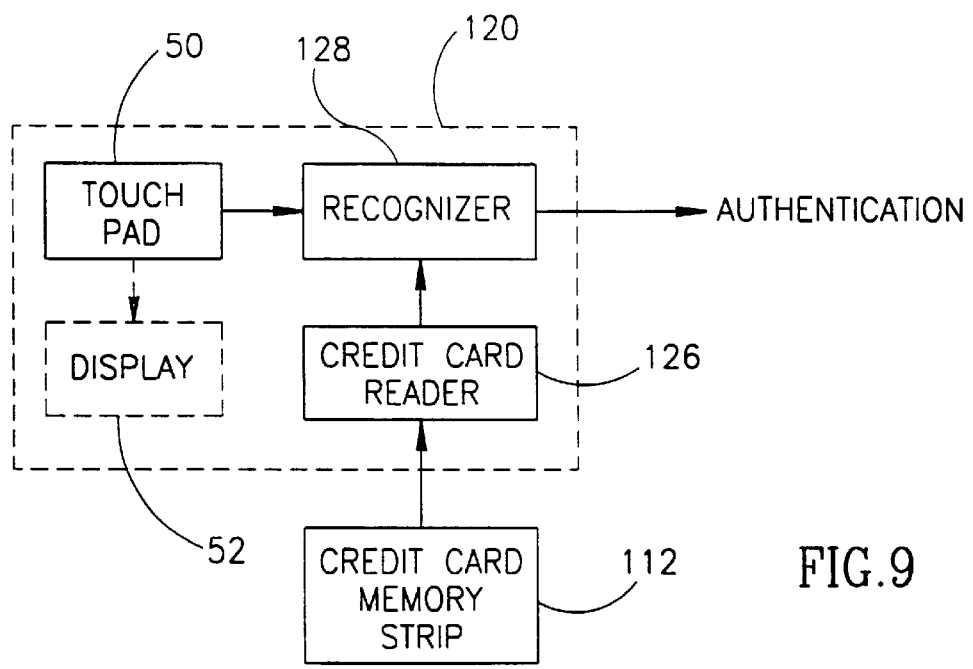
FIG. 9
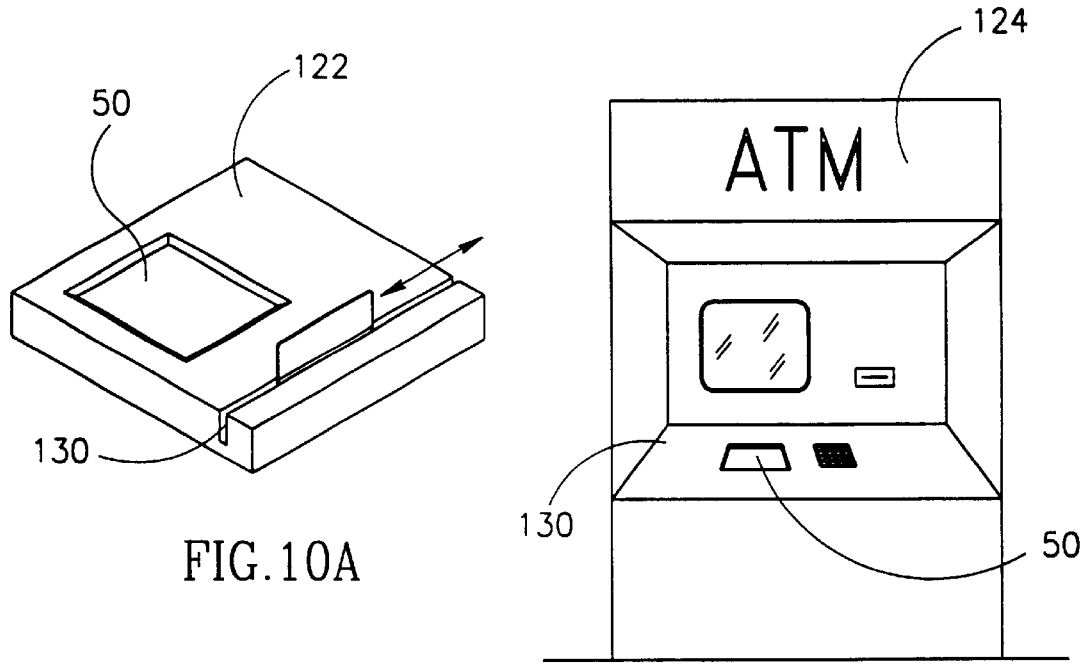
FIG. 10A
FIG. 10B

INSTRUCTION AND/OR IDENTIFICATION INPUT UNIT

RELATIONTIONSHIP TO COPENDING APPLICATIONS

This application is a Division of application Ser. No. 08/878,741, filed Jun. 19, 1997, which is incorporated herein by reference in its entirety.

FIELD OF THE INVENTION

The present invention relates to touchpad pointing devices generally and to their use as an instruction and/or identification input unit in particular.

BACKGROUND OF THE INVENTION

Cursor pointing devices for computers are known in the art, the most common of which is a mouse. Typically, "mice" were peripheral devices kept on the side of the computer and often required a pad along which to slide. With the popularity of laptop computers and their continual reductions in size and weight, other types of mice have been produced.

FIG. 1, to which reference is now made, illustrates a laptop computer 10 with a further type of cursor pointing device 12, known as a touchpad pointing device, and two selecting buttons 14. Although not shown, touchpad pointing devices can also be implemented as external devices connectable to a laptop or desktop computer.

The touchpad pointing device 12 typically is a flat pad which identifies the location of a finger, labeled 16, thereon relative to the edges of the pad (i.e. absolute) or to the previous position (i.e. relative) of finger 16. The touchpad pointing device 12 also includes hardware (not shown) which translates the current position (absolute or relative) to a position on the screen. Thus, as the finger 16 sketches a curve 20 on touchpad pointing device 12, a cursor 22 follows a similiar curve 24 on a screen 26 of laptop computer 10. When the user has brought cursor 22 to a desired location, such as above the word "FILE" as shown, he executes the action by either pressing one of buttons 14 or tapping on touchpad pointing device 12.

SUMMARY OF THE PRESENT INVENTION

The present invention is an instruction and/or identification unit which utilizes a touchpad pointing device as the input unit for receiving instruction and/or identification patterns. This is accomplished without changing any aspect of the operation of the touchpad pointing devices themselves.

There is therefore provided, in accordance with a preferred embodiment of the present invention, an instruction input unit for supplying operating instructions to a machine. The unit includes a touchpad, an instruction library and a recognizer. The touchpad receives an input pattern from a user and the instruction library stores a multiplicity of operating instruction patterns. Each operating instruction pattern has an operating instruction associated therewith. The recognizer detects which of the multiplicity of operating instructions patterns the input pattern most closely matches and provides the operating instruction associated with the matched operating instruction pattern to the machine.

Moreover, in accordance with a preferred embodiment of the present invention, the machine is an appliance and can be one of a microwave oven, a washing machine and a remote control unit.

Further, in accordance with a preferred embodiment of the present invention, the recognizer also includes a handwriting recognizer for recognizing alphanumeric characters.

The present invention also incorporates all machines having instruction input units such as are described hereinabove.

There is also provided, in accordance with a second preferred embodiment of the present invention, a shortcut input unit for providing telephone numbers to be dialed to a telephone. The shortcut input unit includes the touchpad, a shortcut library and a trainable recognizer. The shortcut library is capable of receiving and storing a multiplicity of shortcut patterns wherein each shortcut pattern has a telephone number associated therewith. The trainable recognizer has a training mode and a recognition mode. In the training mode, the trainable recognizer associates telephone numbers received from the user with shortcut patterns received from the user via the touchpad. In the recognition mode, the trainable recognizer detects which of the multiplicity of shortcut patterns an input pattern received from the user most closely matches and provides the telephone number associated with the matched shortcut pattern to the telephone. The user can provide the telephone numbers via a keypad or by writing the numbers on the touchpad which the trainable recognizer recognizes.

Additionally, in accordance with this preferred embodiment of the present invention, the telephone can be a cellular telephone, a wireless telephone and a desktop telephone.

The present invention also incorporates telephones having dialers and shortcut input units.

There is further provided, in accordance with a third preferred embodiment of the present invention, an identification unit which includes the touchpad, an identifier library and the recognizer. The identifier library stores at least one identifier pattern and the recognizer detects if the input pattern matches one of the identifier patterns and provides an authorization signal only if a match is detected. The recognizer can be trainable, in which case, the identifier library is capable of receiving trained identifier patterns. The identifier pattern can be a signature.

Additionally, in accordance with this preferred embodiment of the present invention, the identification unit can be implemented in a lock which includes a locking mechanism which unlocks upon receipt of the authorization signal from the identification unit.

Moreover, in accordance with this preferred embodiment of the present invention, the locking mechanism locks a door to a door frame. The door can be part of a car, a room or any other lockable unit. The room can be a hotel guest room.

There is also provided, in accordance with a further preferred embodiment of the present invention, a credit card authorizer for authorizing the use of a credit card. The credit card has a memory strip which stores at least one identifier pattern. The authorizer includes the touchpad and a recognizer. The recognizer detects if the input pattern matches one of the identifier patterns and provides an authorization signal only if a match is detected.

Moreover, in accordance with this preferred embodiment of the present invention, the credit card authorizer can be implemented in an automatic teller machine.

Finally, in accordance with a further preferred embodiment of the present invention, there is provided a credit card writer for writing information into a memory strip of a credit card. The credit card writer includes the touchpad and a credit card imprinter which imprints the input pattern into the memory strip of the credit card.

BRIEF DESCRIPTION OF THE DRAWINGS

The present invention will be understood and appreciated more fully from the following detailed description taken in conjunction with the drawings in which:

FIG. 4 is a block diagram illustration of a shortcut input unit, constructed and operative in accordance with a second preferred embodiment of the present invention, and operative with a dialer;

FIGS. 5A and 5B are schematic illustrations of the shortcut input unit of FIG. 4 implemented in a desktop telephone and a cellular telephone, respectively;

FIG. 9 is a block diagram illustration of a credit card authenticator, constructed and operative in accordance with a fifth preferred embodiment of the present invention; and FIGS. 10A and 10B are schematic illustrations of the credit card authenticator of FIG. 9 implemented in a credit card authorizer and an automatic teller machine, respectively.

DETAILED DESCRIPTION OF PREFERRED EMBODIMENTS

Figure 1:
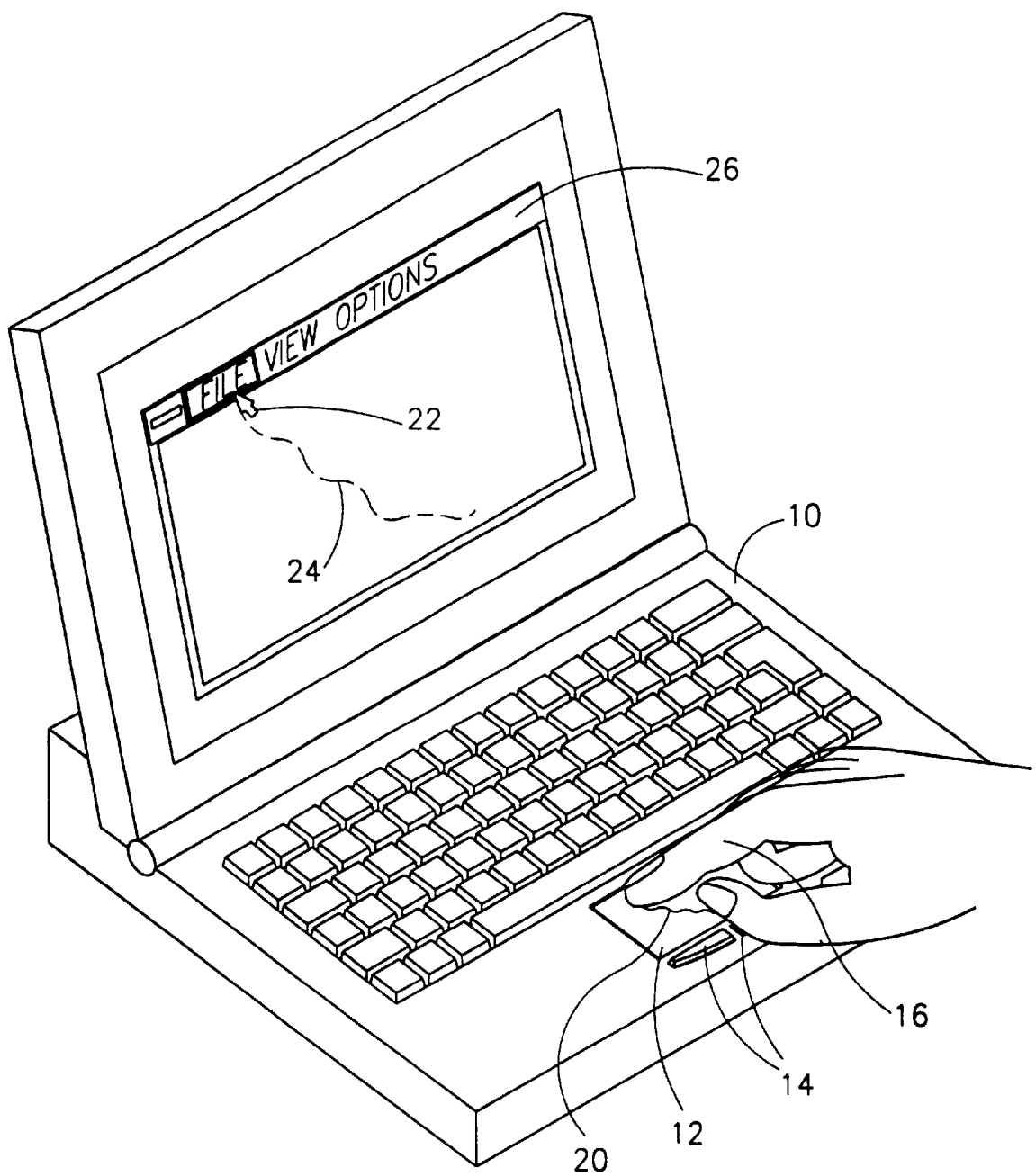
FIG. 1 is a schematic illustration of a prior art touchpad pointing device forming part of a laptop computer.
Figure 2:
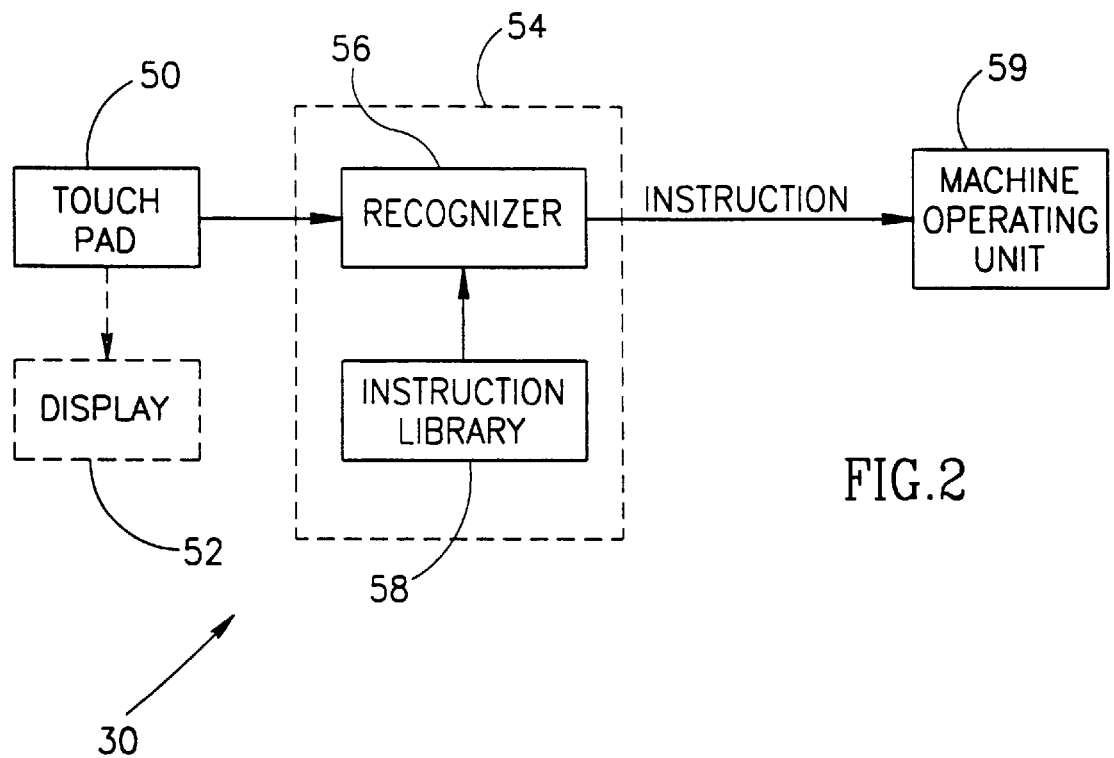
FIG. 2 is a block diagram illustration of an instruction unit, constructed and operative in accordance with a preferred embodiment of the present invention.
Figure 3A:
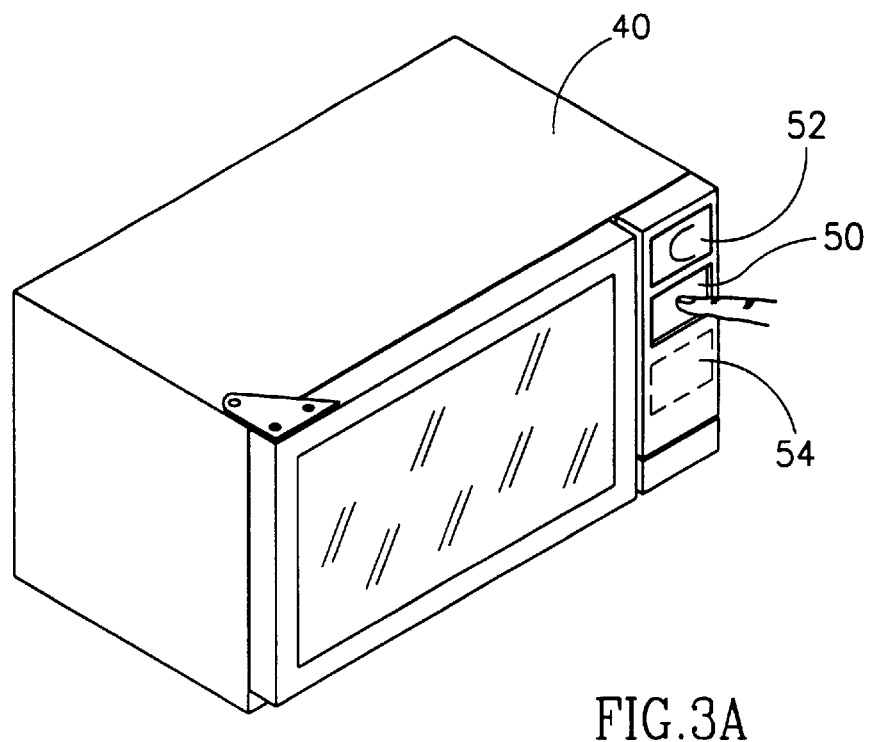
FIGS. 3A, 3B and 3C are schematic illustrations of the instruction unit of FIG. 2 implemented in a microwave oven, a washing machine and a remote control unit, respectively.
Figure 3B:
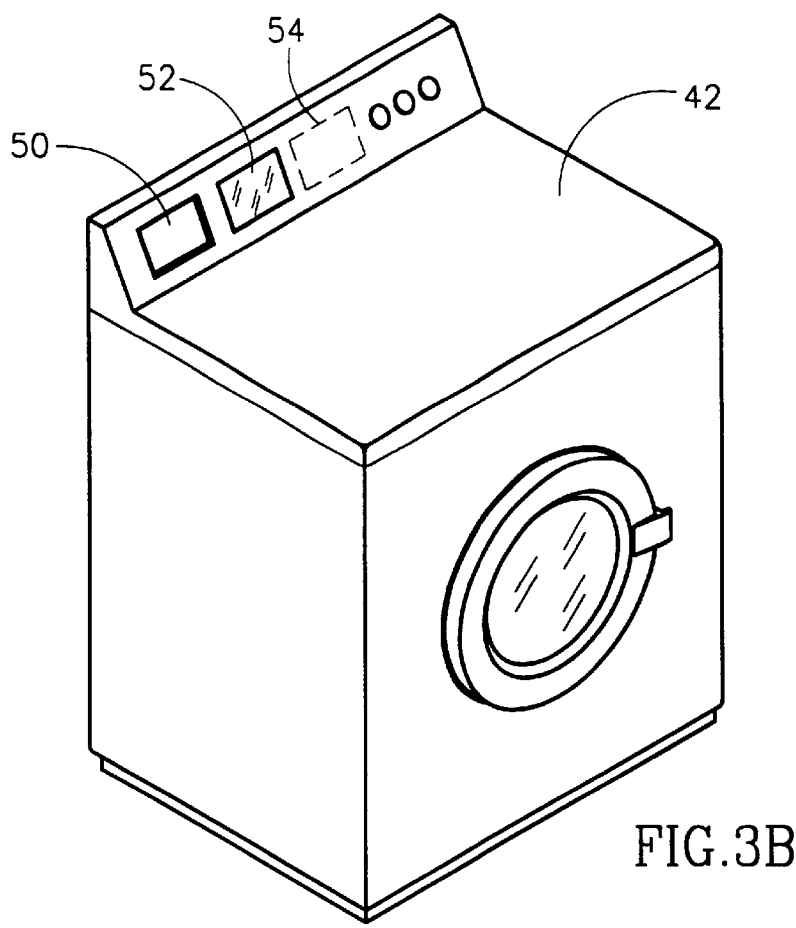
Figure 3C:
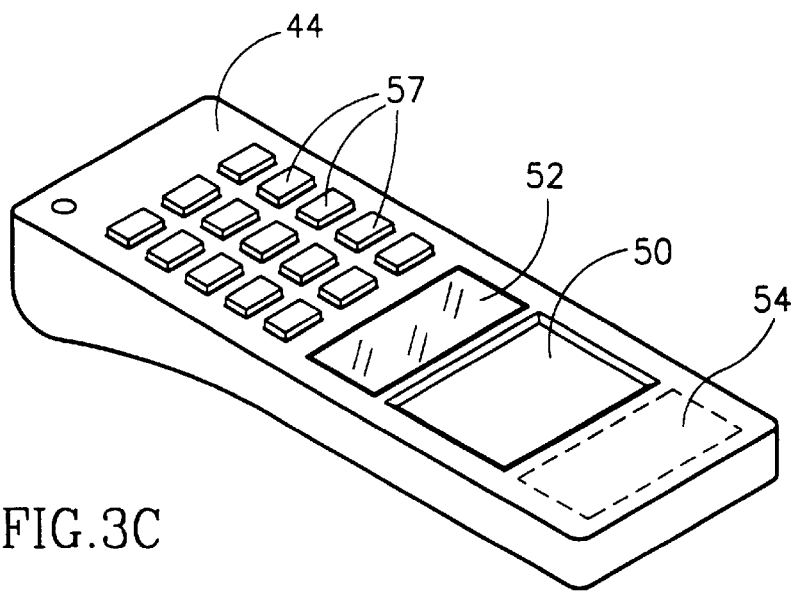

Reference is now made to FIG. 2 which illustrates, in block diagram format, an instruction input unit 30 for supplying operating instructions to a machine, constructed and operative in accordance with a preferred embodiment of the present invention. Reference is also made to FIGS. 3A, 3B and 3C which illustrate the instruction input unit 30 implemented in a microwave oven 40, a washing machine 42 and a remote control unit 44. It will be appreciated that instruction input unit 30 can be implemented in any other appliance or machine which receives instructions.

Instruction input unit 30 typically comprises a touchpad, labeled 50, an optional display 52 and a recognition unit 54, which, in turn, comprises a recognizer 56 and an instruction library 58. Recognizer 56 can be any suitable recognizer, which receives the input pattern and matches it to a previously stored pattern. For example, recognizer 56 can be any of those described in U.S. patent applications Nos. 08/282, 187, 07/978,578, 08/528,293 (now issued U.S. Pat. No. 6,023,529), Ser. No. 08/428,806 (now issued as U.S. Pat. No. 5,774,582) all assigned to the common assignee of the present invention and incorporated herein by reference.

Instruction library 58 stores a multiplicity of preset instruction patterns associated with a multiplicity of machine instructions, the latter to be provided to a machine operating unit 59 thereby to cause a desired action to occur. Machine operating unit 59 is a part of the machine into which instruction unit 30 is incorporated and is typically the unit which, in the prior art, received instructions from the user interface.

FIGS. 3A, 3B and 3C show touchpad 50 and optional display 52 as user interface devices while recognition unit 54 is illustrated with hidden lines since it generally is found internal to the machine. Machine operating unit 59 is not shown in any of FIGS. 3A, 3B and 3C since it is a part of the relevant machine.

Once a user draws a pattern on touchpad 50, which he optionally views on display 52, touchpad 50 provides the input pattern to recognizer 56 which attempts to match the input pattern to one of the instruction patterns stored in instruction library 58. Recognizer 56 then provides the instruction associated with the matched instruction pattern to machine operating unit 59, thereby to command an operation of the machine or to provide the machine with operation information.

For example, FIG. 3A shows a user writing the letter "C" on touchpad 50 (which is displayed in optional display 52) as an instruction for microwave oven 40. The instruction pattern "C" might be associated with the instruction "Cook". Another instruction pattern might be the letter "T" associated with the command is "Time". For the latter, a second instruction pattern might be the length of time "1:00" for which the food must cook. Recognizer 56 recognizes the numbers in the second input pattern and provides them to microwave oven 40 as operation information, rather than as a command. In all cases, recognizer 56 provides tile instruction associated with the recognized pattern to operating unit 59 (FIG. 2) which operates microwave oven 40 accordingly.

The instruction patterns can also be alphanumeric characters, each of which can be separately recognized. Thus, the user can input the following letters: "C", "O", "O" and "K" and recognizer 56 will recognize the letters individually, producing the string "cook". Recognizer 56 will then provide the string "cook" to the machine operating unit 50 of microwave oven 40 as the instruction.

Washing machine 42 (FIG. 3B) operates similarly, where the user provides input patterns to touchpad 50 based on a preset list of instructions. When the input pattern is recognized, the associated instruction is provided to the washing machine operating unit to operate washing machine 42 accordingly.

Remote control unit 44 (FIG. 3C) can be any type of remote control unit such as one controlling a television, a video cassette recorder (VCR), a stereo system, etc. Unit 44 utilizes instruction input unit 30 (shown as the separate touchpad 50, optional display 52 and recognition unit 54) to replace most, if not all, of the many buttons on prior art remote control units. FIG. 3C shows an example of a remote control unit having some numerical buttons 57 and touchpad 50, optional display 52 and recognition unit 54 of instruction input unit 30 for providing all other types of instructions, such as alphabetical instructions.

It will be appreciated that the present invention is a single user interface unit for a machine. Instruction input unit 30 replaces the multiple buttons of a machine with a single input unit capable of receiving many different types of input patterns.

As is known in the art of pattern recognition, recognition systems can also be trained with personal patterns. For example, and as shown in FIGS. 4, 5A and 5B to which reference is now made, the combination touchpad—recognition unit can be utilized as a dial shortcut input unit for desktop (FIG. 5A) and cellular (FIG. 5B) telephones. FIG. 4 illustrates the shortcut input unit 60 in block diagram format, FIG. 5A shows unit 60 in a desktop telephone 62 and FIG. 5B shows unit 60 in a cellular telephone 64. Similar reference numerals of previous figures refer to similar elements.

Shortcut input unit 60 comprises touchpad 50, optional display 52, and a trainable recognition unit 70 and operates in conjunction with dialer 73 of either telephone 62 or 64. Dialer 73 forms part of telephone 62 or 64 and is the element which receives the telephone number from the user interface and instructs telephone 62 or 64 to dial the received telephone number. Shortcut input unit 60 can also operate with a keypad 72 which forms part of telephone 62 or 64.

Trainable recognition unit 70 comprises a mode switch 80, a trainable recognizer 82, and a trained library 84 in which are stored the patterns trained by the specific user of the telephone 62 or 64 and the telephone numbers associated with the patterns. Trainable recognizer 82 can be any suitable trainable recognizer, such as any of the recognizers cited hereinabove, which include a training ability, i.e. the ability to add patterns to library 84 in addition or instead of any previously entered pattern or patterns.

When mode switch 80 is set to a "train" mode, trainable recognizer 82 receives a pattern provided by touchpad 50 as a shortcut pattern to be stored, rather than a pattern to be recognized. In addition, trainable recognizer 82 accepts the telephone number to be associated with the input shortcut pattern.

The input shortcut pattern and the telephone number are stored in library 84, for later use in recognition. Thus, in the train mode, the user stores selected telephone numbers and associates therewith a shortcut pattern (which can be any pattern, such as the name of the person who has the telephone number).

The user can provide the telephone number either via keypad 72 or by riting the telephone number on touchpad 50. In order to receive the handwritten number to be associated with the input shortcut pattern, trainable recognizer 82 switches to a "handwriting recognition" mode in which recognizer 82 separately recognizes each of the numbers of the telephone number by matching them to a preset library of numerical patterns. The recognized telephone number is then associated with the already received shortcut pattern and stored in library 84.

When mode switch 80 is set to a "pattern recognition" mode, trainable recognizer 82 attempts to match the input pattern provided by touchpad 50 to one or more of the shortcut patterns stored in library 84.

Alternatively, the shortcut pattern can be a string of letters, presumably indicating the name of the person being called. For this, trainable recognizer 82 enters the handwriting recognition mode and recognizes each letter separately (as a standard letter, e.g. an ASCII letter). Trainable recognizer 82 then tries to match the resultant letter string to a previously stored string of letters to which the phone number is associated.

Trainable recognizer 82 then provides the telephone number associated with the matched shortcut pattern or recognized word to the dialer 73 of the relevant telephone 62 or 64.

It will be appreciated that shortcut input unit 60 of FIGS. 4, 5A and 5B enables a user to associate a telephone number with any desired shortcut pattern. It will further be appreciated that the present invention is operative with all types of telephones, including wall mounted and wireless telephones.

Figure 6:
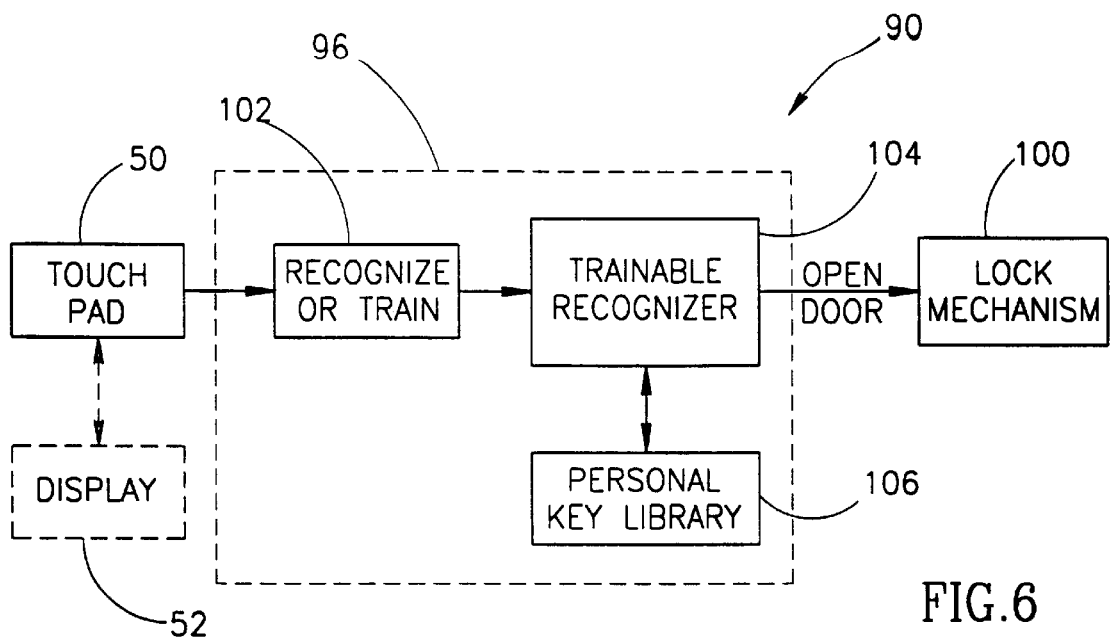
FIG. 6 is a block diagram illustration of an identification unit, constructed and operative in accordance with a third preferred embodiment of the present invention.
Figure 7A:
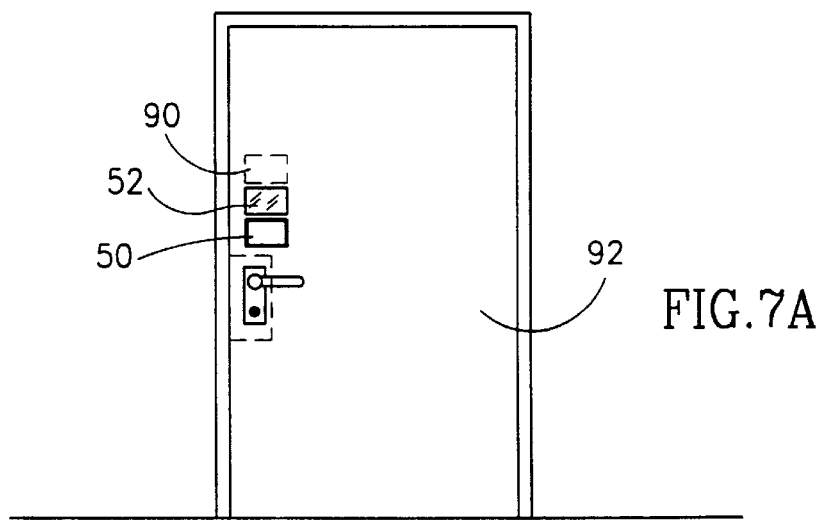
FIGS. 7A and 7B are schematic illustrations of the identification unit of FIG. 6 implemented in a room door and a car door, respectively.
Figure 7B:
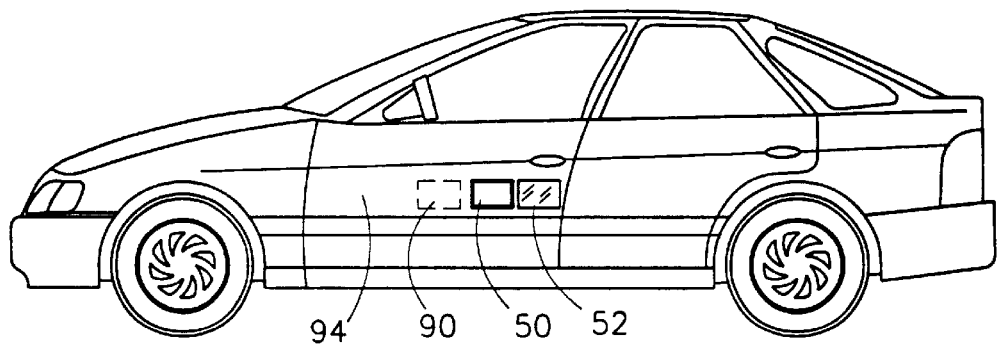

Reference is now made to FIGS. 6, 7A and 7B which illustrate a further embodiment of the present invention as an identification unit 90. FIG. 6 is a block diagram of the elements and FIGS. 7A and 78 are schematic illustrations of the use of identification unit 90 in a house or room door 92 and a car door 94, respectively. It will be appreciated that the present invention incorporates all doors, including safe doors, and all types of lock mechanisms.

Identification unit 90 comprises touchpad 50, optional display 52 and a trainable, security recognition unit 96. Unit 90 controls a lock mechanism 100. An exemplary lock mechanism 100 is an electronic lock of the type commonly found on hotel doors.

Security recognition unit 96 comprises a mode switch 102, a trainable recognizer 104, and a personal key library 106 in which are stored at least one identification pattern associated with an owner of the car or room. Trainable recognizer 104 is similar to trainable recognizer 82 and will not be described in more detail.

In the train mode, the room or car owner produces an identification pattern, such as his signature, on touchpad 50 which, in turn, provides the identification pattern to trainable recognizer 104 for storage in personal key library 106. One or more identification patterns can be stored in library 106.

In the recognition mode, identification unit 90 determines whether or not the identification pattern produced on touchpad 50 matches one of the identification patterns stored in personal key library 106. If the identification pattern does match, then trainable recognizer 104 provides an "open door" activation signal to lock mechanism 100. If there is no match, the activation signal is not produced and the incorrect owner cannot enter the car or room. If lock mechanism 100 is connected also to an alarm system, lock mechanism 100 can activate the alarm system whenever trainable recognizer 104 provides a signal indicating that an identification pattern was received but it did not match the stored identification patterns.

It will be appreciated that identification unit 90 provides a non-key mechanism for securing doors. This is of particular relevance to hotels, where guests often lose their keys. A hotel can replace the key mechanisms of the guest room doors with identification unit 90 and can have a central personal key library 106. In this embodiment, the training process typically occurs as the guest, registers at the hotel and the identification pattern is stored in the central personal key library along with the room number, or numbers, that the guest has rented. A date can also be associated with the identification pattern, after which the identification pattern is no longer valid.

In this embodiment, when a guest draws his identification pattern on the identification unit 90 associated with a room, the recognizer 104, which can be a central recognizer or one forming part of the door, accesses the central library 106 to match the identification pattern with the identification pattern associated with that room, activating the lock mechanism only if there is a match. Many identification patterns can be associated with a room if many people are staying in the room.

In the car embodiment of FIG. 7B, identification unit 90 replaces the standard key mechanism and activates the lock mechanism 100 only if the identification pattern matches a previously stored identification pattern. Furthermore, identification unit 90 can also be utilized to secure the trunk and/or to secure the car ignition mechanism. In the latter case, the lock mechanism 100 will disconnect the ignition if the wrong identification pattern is provided. Lock mechanism 100 can also be connected to an alarm system and can provide an alarm when the wrong identification pattern is provided.

Figure 8A:
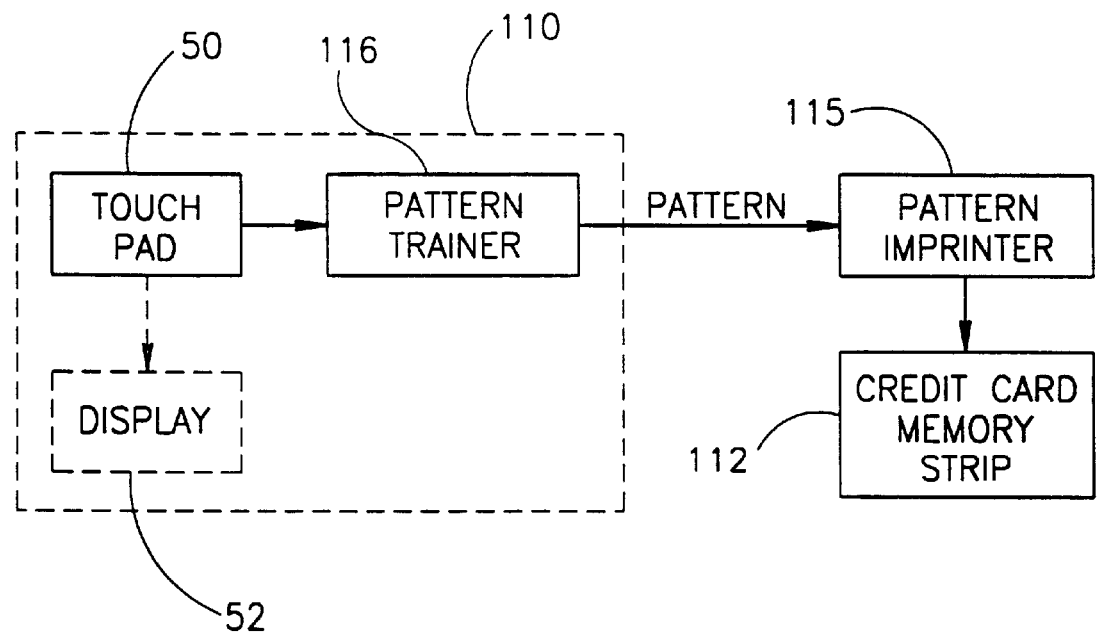
FIGS. 8A and 8B are block diagram and schematic illustrations, respectively, of a credit card trainer, constructed and operative in accordance with a fourth preferred embodiment of the present invention.
Figure 8B:
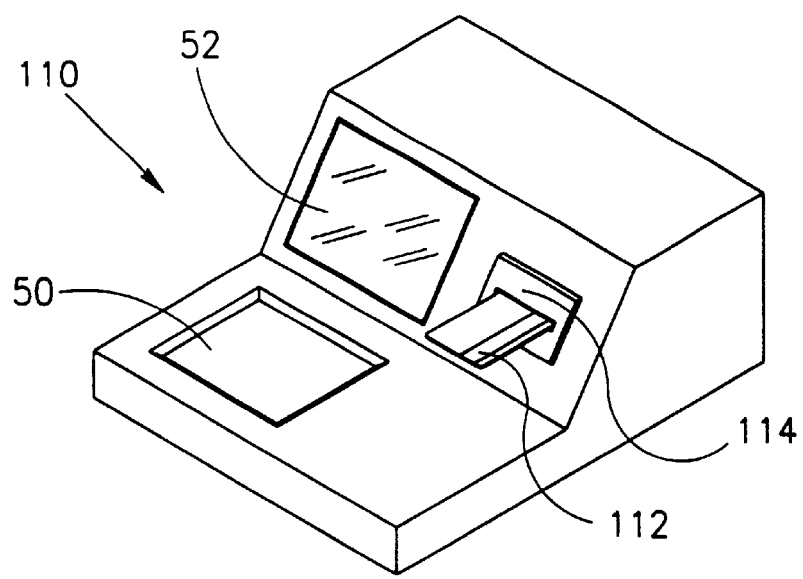

An alternative identification unit can be produced to provide additional security for credit cards. This is illustrated in FIGS. 8A, 8B, 9, 10A and 10B to which reference is now made. FIG. 8A illustrates, in block diagram format, the elements of a credit card trainer 110 and FIG. 8B isometrically illustrates credit card trainer 110. FIG. 9 illustrates the elements of an authenticator 120 and FIGS. 10A and 10B illustrate the elements of authenticator 120 within a credit card authorizer 122 and an automatic teller machine (ATM) 124.

Credit card trainer 110 (FIGS. 8A, 8B) imprints the identification pattern of the card owner within the memory strip 112 of a credit card 114 or within a "smart card". To this end, trainer 110 comprises touchpad 50, optional display 52, a pattern trainer 116 and a pattern imprinter 115. Pattern trainer 116 comprises the training elements of trainable recognition units 82 and 104 and is operative to train one or more identification patterns. Once training has ended, pattern trainer 116 provides the trained identification patterns to pattern imprinter 115 which writes the trained identification pattern to memory strip 112. Pattern imprinter 115 can be any suitable credit card memory strip imprinter, such as are known in the art.

Typically, credit card trainer 110 is located wherever credit cards are provided to a user, such as at a bank or at an ATM. The credit card is placed within trainer 110, as shown in FIG. 8B and the credit card owner draws his identification pattern on touch pad 50 of trainer 110 in accordance with instructions provided by pattern trainer 116. When the identification pattern has been sufficiently trained, pattern trainer 116 provides the identification pattern (or patterns) to pattern imprinter 115 which, in turn, writes the identification pattern on the memory strip 112. As a result, credit card 114 becomes a transportable "library" of identification patterns for the credit card owner.

As shown in FIG. 9, authenticator 120 comprises touchpad 50, optional display 52, a credit card reader 126 and a recognizer 128. Credit card reader 126 reads the identification pattern from memory strip 112 of the credit card to be authenticated and recognizer 128 compares the identification pattern with the identification pattern produced from touchpad 50. If the two patterns match, recognizer 128 provides an authentication signal to either credit card authorizer 122 or ATM 124. Otherwise, recognizer 128 provides a non-authorization signal.

When the credit card owner wishes to utilize his credit card, such as at a store or at an ATM, he passes the credit card through the strip 130 (FIGS. 10A and 10B) of credit card reader 126. At the same time, the credit card owner writes his identification pattern onto touchpad 50 of authenticator 120. Recognizer 128 compares the two patterns and provides an authentication signal if the two patterns match. Credit card authorizer 122 utilizes the authentication signal to enable crediting of the sale to the credit card. ATM 124 utilizes the authentication signal to enable the credit card owner to perform bank transactions.

Alternatively (not shown), credit card trainer 110 can store the identification pattern within a central database in which the identification pattern is associated with the number of credit card 114. In this embodiment, credit card trainer 110 does not include pattern imprinter 115 and authenticator 120 retrieves the identification pattern from the central database rather than from credit card memory strip 112.

It will be appreciated by persons skilled in the art that the present invention is not limited to what has been particularly shown and described hereinabove. Rather the scope of the present invention is defined only by the claims which follow:

We claim:

1. A shortcut input unit for providing telephone numbers to be dialed to a telephone, the unit comprising:

a. a touchpad for receiving a handwritten input pattern from a user;

b. a shortcut library capable of receiving and storing a multiplicity of shortcut patterns wherein each shortcut patter has a telephone number associated therewith; and c. a trainable recognizer having a training mode and a recognition mode, wherein, in said training mode, said trainable recognizer associates telephone numbers received from said user with shortcut patterns received from said users via said touchpad and in said recognition mode, said trainable recognizer detects which of said multiplicity of shortcut patterns a handwritten input pattern received from said user most closely matches and provides the telephone number associated with the matched shortcut pattern to said telephone.

2. A shortcut input unit according to claim 1 and wherein said telephone is one of the following group: a cellular telephone, a wireless telephone and a desktop telephone.

3. A telephone comprising:

a. a dialer for dialing a telephone number; and b. a shortcut input unit for providing telephone numbers to be dialed to said dialer, wherein the shortcut input unit comprises:

i. a touchpad for receiving a handwritten input pattern from a user;

ii. a shortcut library capable of receiving and storing a multiplicity of shortcut patterns wherein each shortcut pattern has a telephone number associated therewith; and iii. a trainable recognizer having a training mode and a recognition mode, wherein, in said training mode, said trainable recognizer associates telephone numbers received from said user with shortcut patterns received from said user via said touchpad and in said recognition mode, said trainable recognizer detects which of said multiplicity of shortcut patterns a handwritten input pattern received from said user most closely matches and provides the telephone number associated with the matched shortcut pattern to said telephone.

* * * * *